United States Patent [19]

Kabasawa et al.

[11] Patent Number: 5,889,638
[45] Date of Patent: Mar. 30, 1999

[54] HEAD CARRIAGE WITH RESTRAINING MEMBER THAT ENGAGES LEAD SCREW DURING A SHOCK

[75] Inventors: Hidetoshi Kabasawa, Saitama-ken; Yuki Yoshida, Tokorozawa, both of Japan

[73] Assignee: TEAC Corporation, Tokyo, Japan

[21] Appl. No.: 883,014

[22] Filed: Jun. 26, 1997

Related U.S. Application Data

[63] Continuation of Ser. No. 579,252, Dec. 27, 1995, abandoned.

[30] Foreign Application Priority Data

Dec. 28, 1994 [JP] Japan ...................................... 6-328940

[51] Int. Cl.$^6$ ................................ G11B 5/55; G11B 21/08
[52] U.S. Cl. ........................................... 360/106; 369/223
[58] Field of Search .................................... 360/105, 106, 360/109; 369/215, 219, 222, 223

[56] References Cited

U.S. PATENT DOCUMENTS

| 4,528,607 | 7/1985 | Thompson | 360/106 |
|---|---|---|---|
| 5,187,624 | 2/1993 | Shigemoto | 360/105 X |
| 5,198,946 | 3/1993 | Kurosawa | 360/105 |
| 5,535,076 | 7/1996 | Kamioka et al. | 360/106 |
| 5,546,252 | 8/1996 | Hasegawa | 360/106 |

FOREIGN PATENT DOCUMENTS

| 1-86377 | 3/1989 | Japan . |
|---|---|---|
| 3-98763 | 10/1991 | Japan . |
| 5-41043 | 2/1993 | Japan . |

Primary Examiner—William R. Korzuch
Attorney, Agent, or Firm—Michael N. Meller

[57] ABSTRACT

A head carriage of a disk drive apparatus includes a carriage main body for supporting a first magnetic head; and a head arm which is rotatably provided in the carriage main body, and supports a second magnetic head. The head carriage has an engaging projection engaged with the lead screw and is moved by a distance in proportion to the rotation of the lead screw driven by a stepping motor. A restraining member that is detached from the spiral groove of the lead screw and restrains; relative displacement of the head carriage with respect to the lead screw. The restraining member is provided in the carriage main body.

3 Claims, 11 Drawing Sheets

HEAD CARRIAGE WITH RESTRAINING MEMBER THAT ENGAGES LEAD SCREW DURING A SHOCK

This application is a continuation, of application Ser. No. 08/579,252, filed Dec. 27, 1995, now abandoned.

BACKGROUND OF THE INVENTION

1. Field of the Invention

The present invention generally relates to disk driving apparatus, and more particularly, to a disk driving apparatus constructed wherein a head carriage is moved in accordance with the rotation of a lead screw.

2. Description of the Related Art

In a magnetic disk drive apparatus capable of performing magnetic reading and writing with respect to a flexible magnetic disk (hereinafter, simply referred to as a disk) accommodated in a disk cartridge, the front end of the disk cartridge comes into contact with a latch lever when the disk cartridge is inserted into a holder, so that a slider is released from engagement with the holder. The slider slides toward the front of the magnetic disk drive apparatus due to a spring force so that the holder is moved to a predetermined position, thus causing the disk accommodated in the disk cartridge to be mounted on a turntable.

Magnetic reading and writing is effected when a head carriage which supports a magnetic head is moved in a radial direction of the disk so as to allow the magnetic head to slide on the disk. One known carriage driving mechanism for moving the head carriage includes a lead screw that lies in a radial direction of the disk; a stepping motor for driving the lead screw into rotating motion; an engaging projection that is engaged with a spiral groove formed around the periphery of the lead screw; and a torsion spring which urges the lead screw toward the engaging projection.

The engaging projection engaged with the lead screw is provided to be integral with a main body of the head carriage for supporting the magnetic head. In order to reduce the weight and cost of the magnetic disk driving apparatus, the main body of the head carriage and the engaging projection are formed of a synthetic resin to be integral with each other.

In a carriage driving mechanism constructed as described above, the driving force of the lead screw that is driven into rotation is transmitted to the head carriage via the engaging projection. For this reason, the engaging projection bears a load of the head carriage.

The above-described construction of a conventional disk drive apparatus wherein the engaging projection is engaged with the spiral groove of the lead screw, the engaging projection bears a significant load when a shock is applied, causing the head carriage to undergo an excessive acceleration temporarily. Such a shock may be applied when rugged use occurs, for example, when the disk drive apparatus is carried by a user to a certain place or when an electronic equipment like a note-type personal computer having a built in disk drive apparatus, is placed on a desk.

Thus, the conventional disk drive apparatus has a problem in that the synthetic-resin engaging projection built therein may be damaged due to a shock exceeding a predetermined level is applied to the disk drive apparatus.

SUMMARY OF THE INVENTION

Accordingly, an object of the present invention is to provide a disk drive apparatus in which the aforementioned problem is eliminated.

Another and more specific object of the present invention is to provide a disk drive apparatus in which an engaging projection is not damaged even in the event that a shock is applied to the disk drive apparatus.

In order to achieve the aforementioned objects, the present invention provides a disk drive apparatus comprising:

a head carriage provided with magnetic heads;

a lead screw extending in a radial direction of a disk and driven into rotation;

an engaging part engaged with a spiral groove of the lead screw for transmitting a driving force of the lead screw to the head carriage; and a restraining member that is detached from the spiral groove of the lead screw for; restraining relative displacement of the head carriage with respect to the lead screw when a shock is applied to the head carriage.

According to the disk drive apparatus of the present invention, a restraining member for restraining relative displacement of the head carriage with respect to the lead screw when a shock is applied to the head carriage is detached from the spiral groove. Therefore, an engaging projection is prevented from undergoing an excessive stress even when an excessive force is applied to the head carriage due to, for example, an external shock. Thus, unlike the conventional construction where only the engaging projection is engaged with a spiral groove of the lead screw, the engaging projection of the present invention is prevented from being damaged due to an excessive force exerted to the head carriage. Hence, the disk drive apparatus according to the present invention is free of a problem wherein the driving control of the head carriage is disabled due to damage to the engaging projection, or wherein tracking precision of the magnetic head is reduced.

BRIEF DESCRIPTION OF THE DRAWINGS

Other objects and further features of the present invention will be apparent from the following detailed description when read in conjunction with the accompanying drawings, in which.

DETAILED DESCRIPTION

Figure 1:
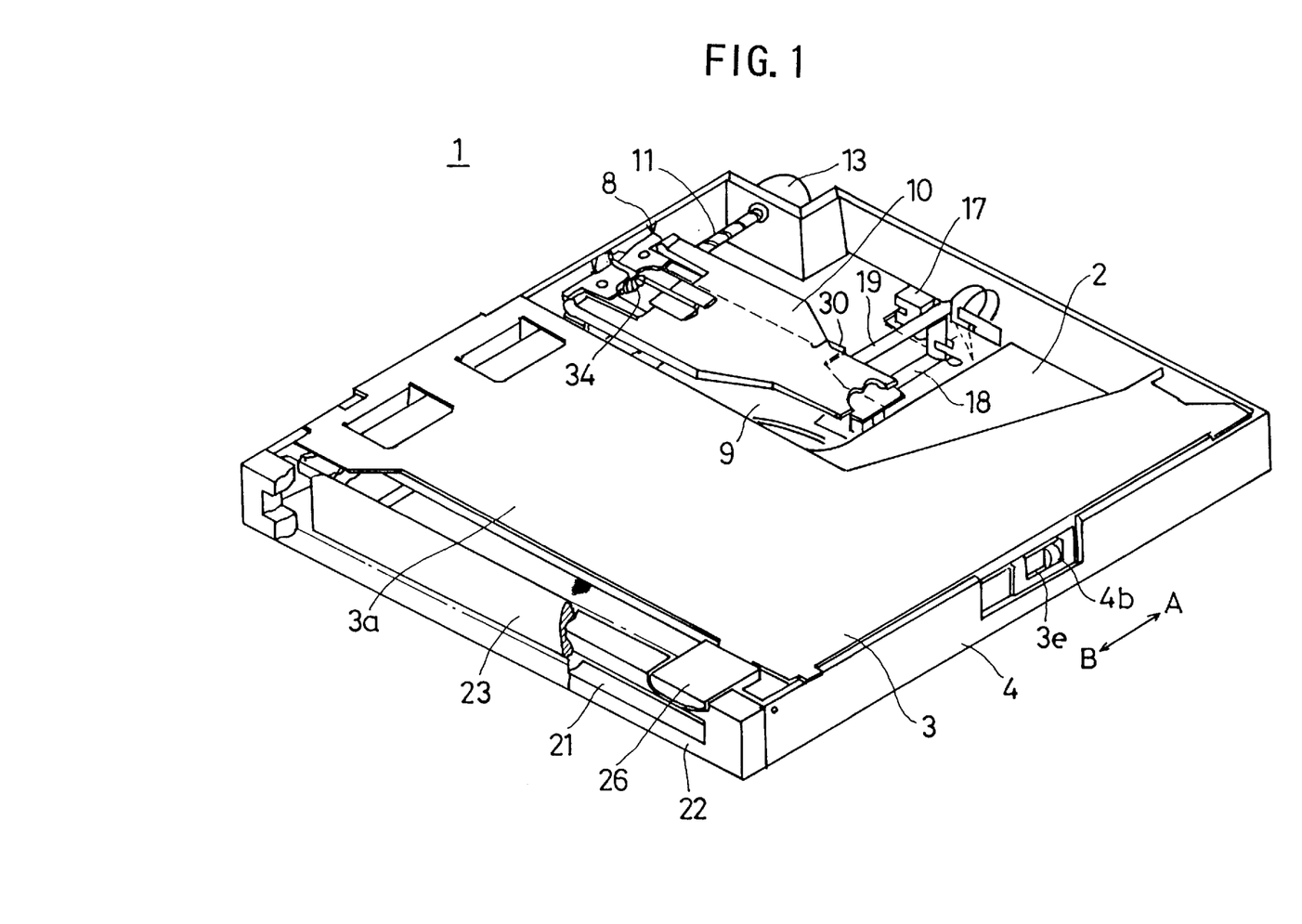
FIG. 1 is a perspective view of a disk drive apparatus according to an embodiment of the present invention.
Figure 2:
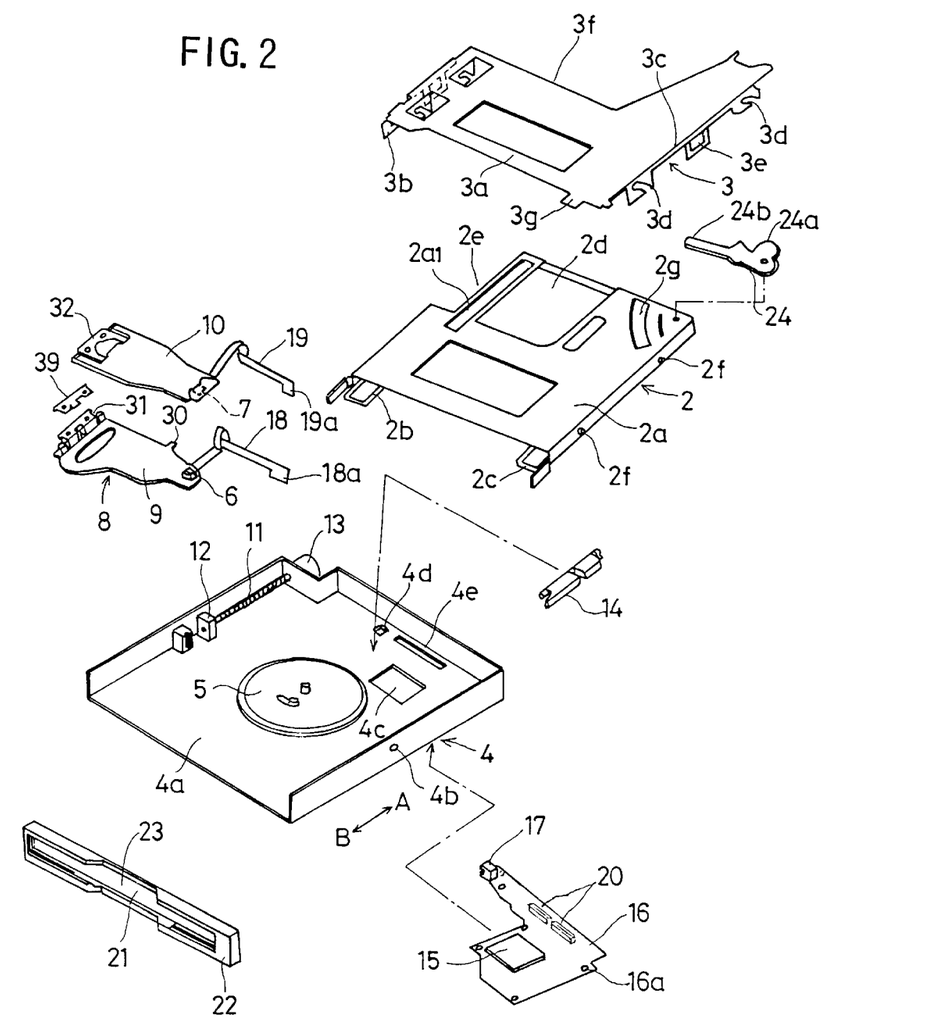
FIG. 2 is an exploded perspective view of the disk drive apparatus.
Figure 3:
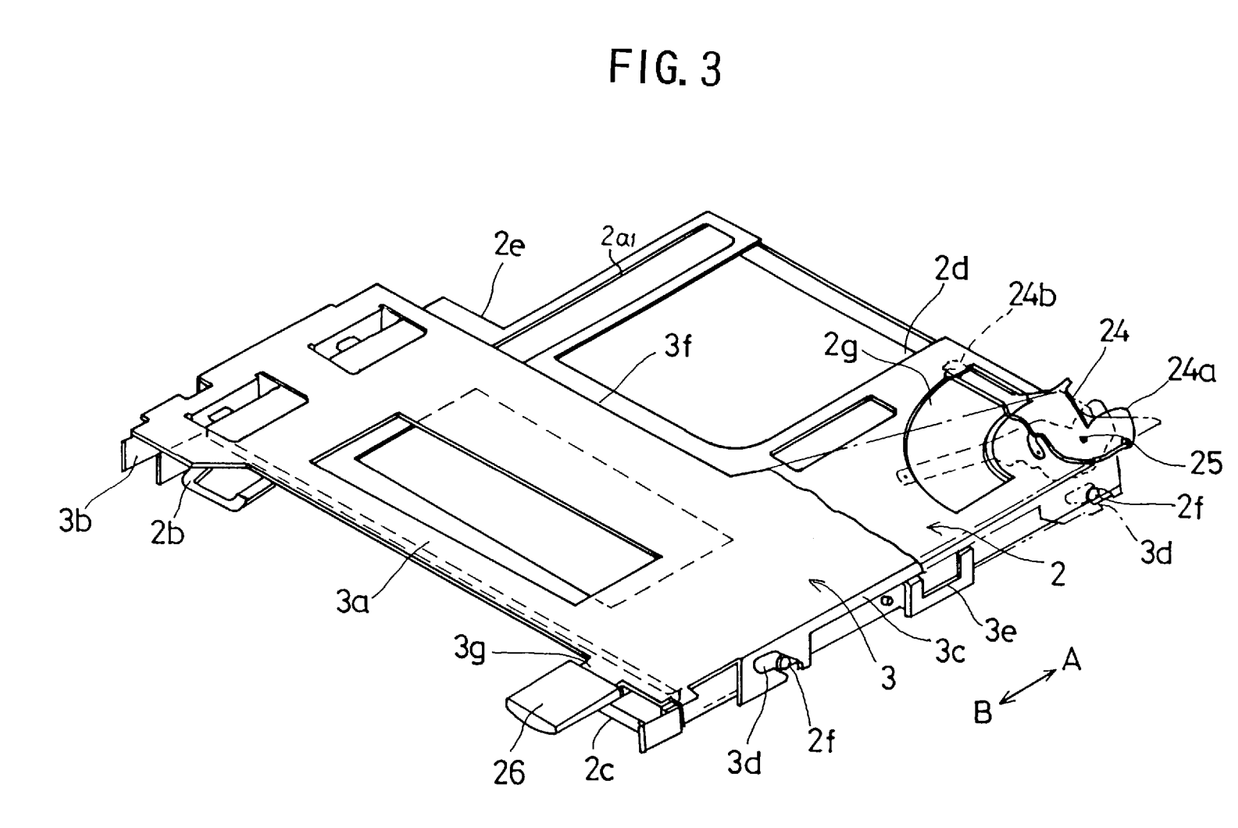
FIG. 3 is a perspective view showing how a holder and a slider are fitted to each other.

FIGS. 1 through 3 show a disk drive apparatus according to an embodiment of the present invention. FIG. 1 is a perspective view of a disk drive apparatus 1; FIG. 2 is an exploded perspective view of the disk drive apparatus 1; and FIG. 3 is a perspective view showing how a holder 2 and a slider 3 are fitted to each other.

The disk drive 1 is constructed such that the holder 2 into which a disk cartridge (not shown) is inserted and the slider 3 for elevating and lowering the holder 2 by sliding back and forth are assembled to a chassis 4. A turntable 5 driven by a disk driving motor and a head carriage 8 supporting magnetic heads 6 and 7 are provided on a surface 4a of the chassis 4.

The head carriage 8 has a carriage main body 9 which supports the magnetic head 6 provided on its end; and a head arm 10 which is rotatable with respect to the carriage main body 9 and supports the magnetic head 7 is provided underneath the end of the head arm 10. The head carriage 8 is positioned laterally with respect to the disk drive apparatus 1 and can be slid back and forth (in the A-B direction) while maintaining its lateral orientation.

The head carriage 8 is engaged with a lead screw 11 that extends in the longitudinal direction of the disk drive apparatus. An end of the lead screw 11 is coupled to a bearing 12 provided on the chassis 4, and the other end of the lead screw is inserted into a stepping motor 13 assembled to the back of the chassis 4.

When the stepping motor 13 rotates the lead screw 11 by a predetermined angle, the head carriage 8 is driven in the A-B direction by a distance that corresponds to the angle so that the magnetic heads 6 and 7 are made to travel to a desired track. In this way, magnetic reading and writing is effected.

A circuit board 16 having a control circuit 15 for controlling the disk drive apparatus 1 built thereon; and a protector 14 for preventing the disk cartridge from colliding with the magnetic head 6 when the disk cartridge is inserted into the holder 2, are provided on the surface 4a of the chassis 4 behind the turntable 5. In addition to the control circuit 15, the circuit board 16 is provided with a track position detecting sensor 17 for detecting that the magnetic heads 6 and 7 are positioned at an outermost track "00" of the disk; and a connector 20 connectable to connecting parts 18a and 19a is provided at the end of flexible wiring boards 18 and 19, respectively. The wiring boards 18 and 19 are connected to the magnetic heads 6 and 7, respectively.

Through holes 4c–4e configured to correspond to the shape of the control circuit 15, the track position detecting sensor 17 and the connector 20, respectively, are provided on the surface 4a of the chassis 4. The circuit board 16 is fixed on the underside of the chassis 4 by vises inserted into holes 16a. Once the circuit board 16 is secured, the control circuit 15, the track position detecting sensor 17 and the connector 20 project above the surface 4a of the chassis 4 through the through hole 4c, the through hole 4d and the through hole 4e, respectively.

A bezel 22 having a disk insertion opening 21 is provided at the front end of the chassis 4. A flap 23 for closing the disk insertion opening 21 from inside is rotatably provided at the back of the front bezel so as to open or close the disk insertion opening 21.

A description will now be given of the construction of main components in the above-described construction. First, the holder 2 and the slider 3, and then the head carriage 8 will be described.

The holder 2 comprises a top plate 2a, and cartridge guide parts 2b and 2c which are provided by bending the lateral ends of the top plate 2a so as to house the disk cartridge from both sides. A space surrounded by the top plate 2a, and the cartridge guide parts 2b and 2c from a cartridge insertion part.

A contact part 2a1 that comes into contact with an underside 10a (see FIG. 8) of the head arm 10 is formed on the top plate 2a of the holder 2 so as to extend in the by A-B direction. More specifically, the cross section of the contact part 2a1 is shaped like a triangle whose apex comes into contact with the underside 10a of the head arm 10 in response to an eject operation so that the head arm 10 is rotated upward.

An opening 2d is provided in the top plate 2a of the holder 2 so as to allow translation of the head carriage 8. A recess 2e is also provided at the left side of the holder 2. Engaging pins 2f engageable with the slider 3 are provided to project from the side of the guide parts 2b and 2c.

A latch lever 24 is rotatably supported by a shaft 25 on the top plate 2a of the holder 2 near the back end of the disk driving apparatus. The latch lever 24 is urged counterclockwise by a spring member (not shown). Before the cartridge is inserted, the latch lever 24 is located at a position indicated by a broken line in FIG. 3. After the cartridge is inserted, the latch lever 24 is rotated to a position indicated by a solid line in FIG. 3.

The latch lever 24 has a latching cam 24a for latching the slider 3 and a shutter opening/closing part 24b which, when inserted into a fan-like opening 2g provided in the top plate 2a so as to extend in the disk insertion part of the holder 2, presses open a shutter (not shown) in response to a disk cartridge insertion operation. The shutter normally closes an opening in the disk cartridge.

The slider 3 is slidably provided on the holder 2 and comprises a top plate 3a opposite to the top plate 2a of the holder 2; sides 3b and 3c provided by bending the lateral ends of the top plate 3a; slanting grooves 3d provided in the sides 3b and 3c and having the engaging pins 2f of the holder 2 fitted therein; and engaging holes 3e engaged with projections 4b projecting from the sides of the chassis 4.

The top plate 3a of the slider 3 is provided with a recess 3f configured to correspond to the openings 2d and the recess 2e of the holder 2, thereby allowing translation of the head carriage 8, which is provided on the left of the slider 3.

The slider 3 also has a projecting piece 3g which projects forward in the right of the front of the slider 3. An eject button 26 is fixed to the projecting piece 3g. A latching part 3h (see FIG. 4) which is latched by the latching cam 24a of the latch lever 24 is provided by bending the rear end of the top plate 3a downward.

Figure 4:
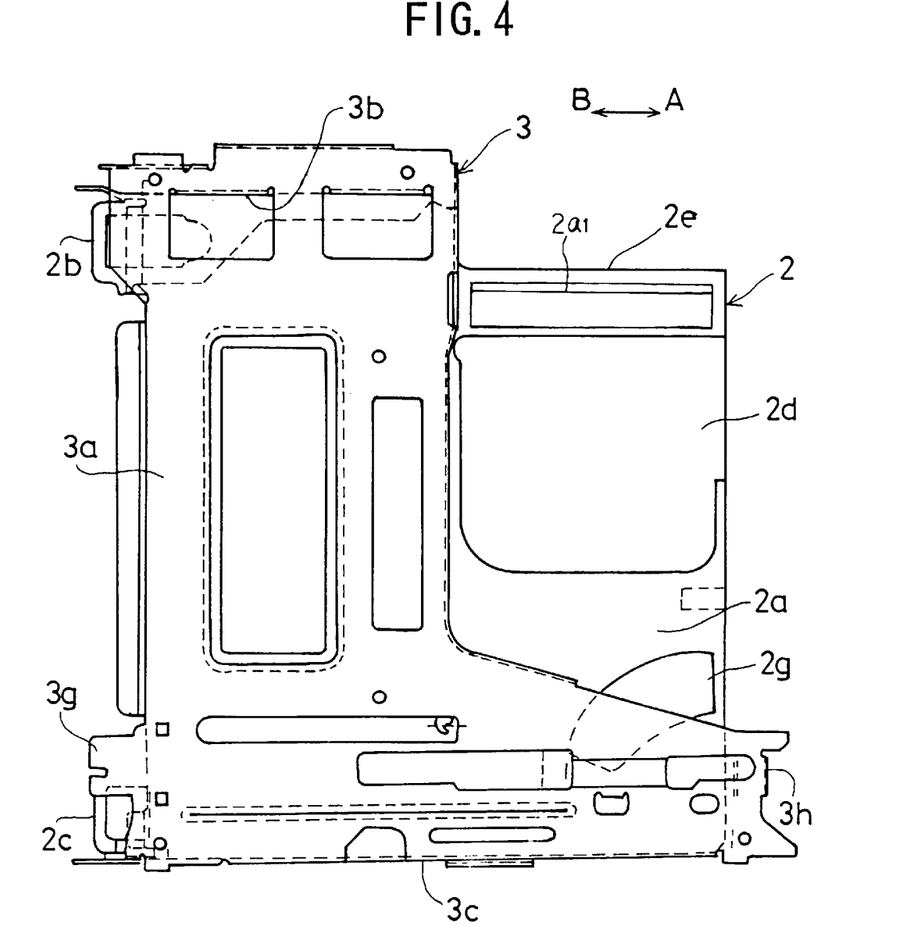
FIG. 4 is a top view showing how the holder and the slider are positioned when a disk cartridge is inserted or ejected.
Figure 5:
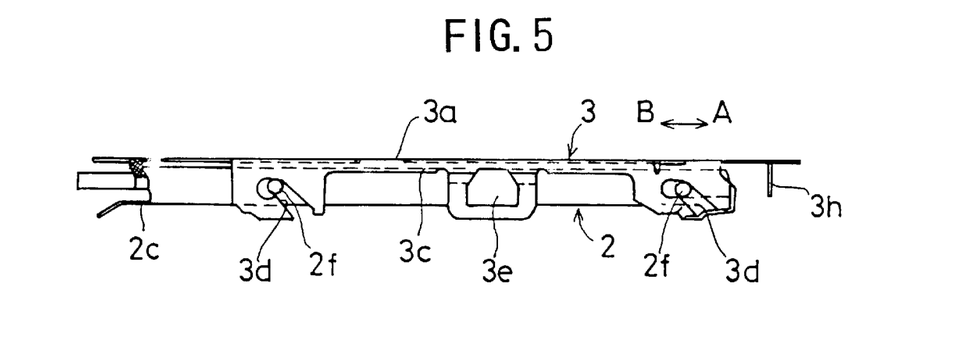
FIG. 5 is a side view showing how the holder and the slider are positioned when the disk cartridge is inserted or ejected.
Figure 6:
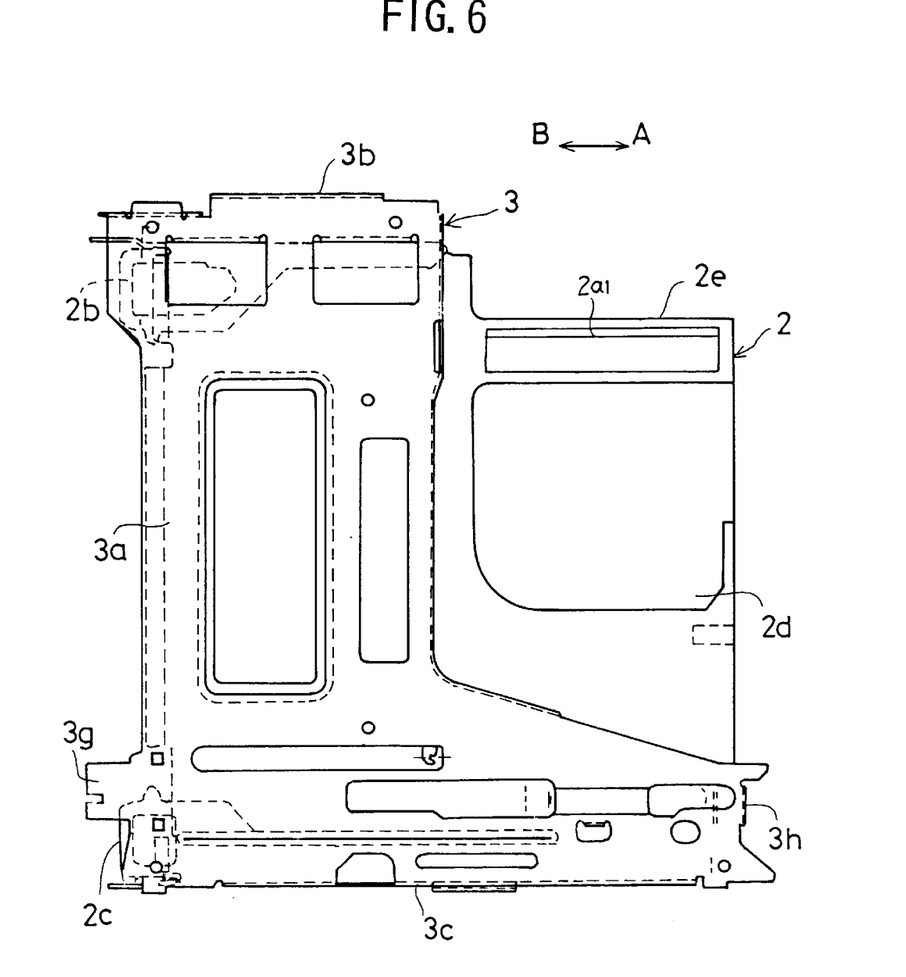
FIG. 6 is a top view showing how the holder and the slider are positioned when the disk cartridge is mounted on a turntable.
Figure 7:
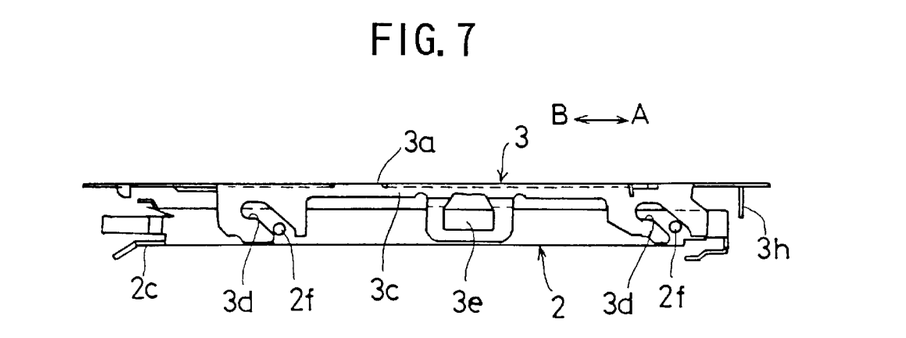
FIG. 7 is a side view showing how the holder and the slider are positioned when the disk cartridge is mounted on the turntable.

FIGS. 4 and 5 show how the holder 2 and the slider 3 are positioned when the disk cartridge is inserted or ejected, FIG. 4 is a top view and FIG. 5 is a side view. FIGS. 6 and 7 show how the holder 2 and the slider 3 are positioned when the disk cartridge is mounted on the turntable, FIG. 6 is a top view and FIG. 7 is a side view.

As shown in FIGS. 4 and 5, the holder 2 and the slider 3 are assembled such that the engaging pins 2f of the holder 2 are engaged with the slanting grooves 3d of the slider 3 in a state in which the top plate 3a of the slider 3 is on top of the top plate 2a of the holder 2. When the disk cartridge is inserted into the cartridge insertion part of the holder 2, the latch lever 24 is pressed by the disk cartridge so as to rotate clockwise.

As a result of this, the shutter of the disk cartridge is pressed open by the shutter opening/closing part 24b of the latch lever 24, and the latching part 3h of the slider 3 is released from engagement with the latch lever 24. Thus, the slider 3 slides in the B direction due to a spring force.

As shown in FIGS. 6 and 7, when the slider 3 slides in the B direction, the engaging pins 2f of the holder 2 move downward in the slanting grooves 3d so that the holder 2 is lowered to a position at which the disk is mounted on the turntable. Since the engaging holes 3e of the slider 3 are engaged with the projections 4b projecting from the sides of the chassis 4, the slider 3 is configured to be slidable only in the A-B direction. That is, the slider 3 is prevented from being elevated or lowered.

When the eject button 26 is pressed after the disk cartridge is mounted as a result of the holder 2 being lowered, the slider 3 slides in the A direction so that the holder 2 is elevated to a disk cartridge insertion/eject position indicated in FIGS. 4 and 5. The latch lever 24 is released from engagement with the latching part 3h of the slider 3 so that the latch lever 24 is rotated counterclockwise. As a result of this, the disk cartridge in the holder 2 is ejected by being pressed by the shutter opening/closing part 24b of the latch lever 24.

Figure 8:
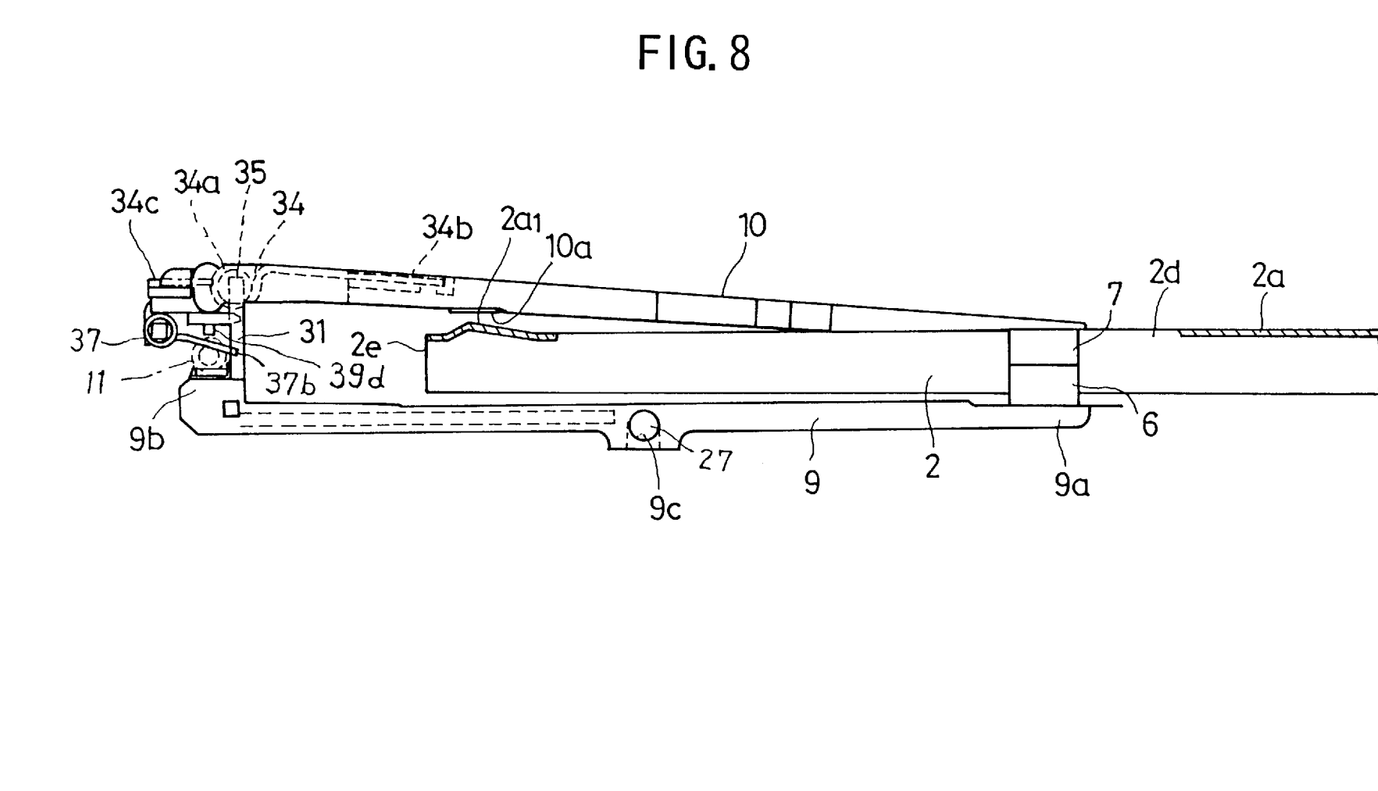
FIG. 8 is a side view of a head carriage.
Figure 9:
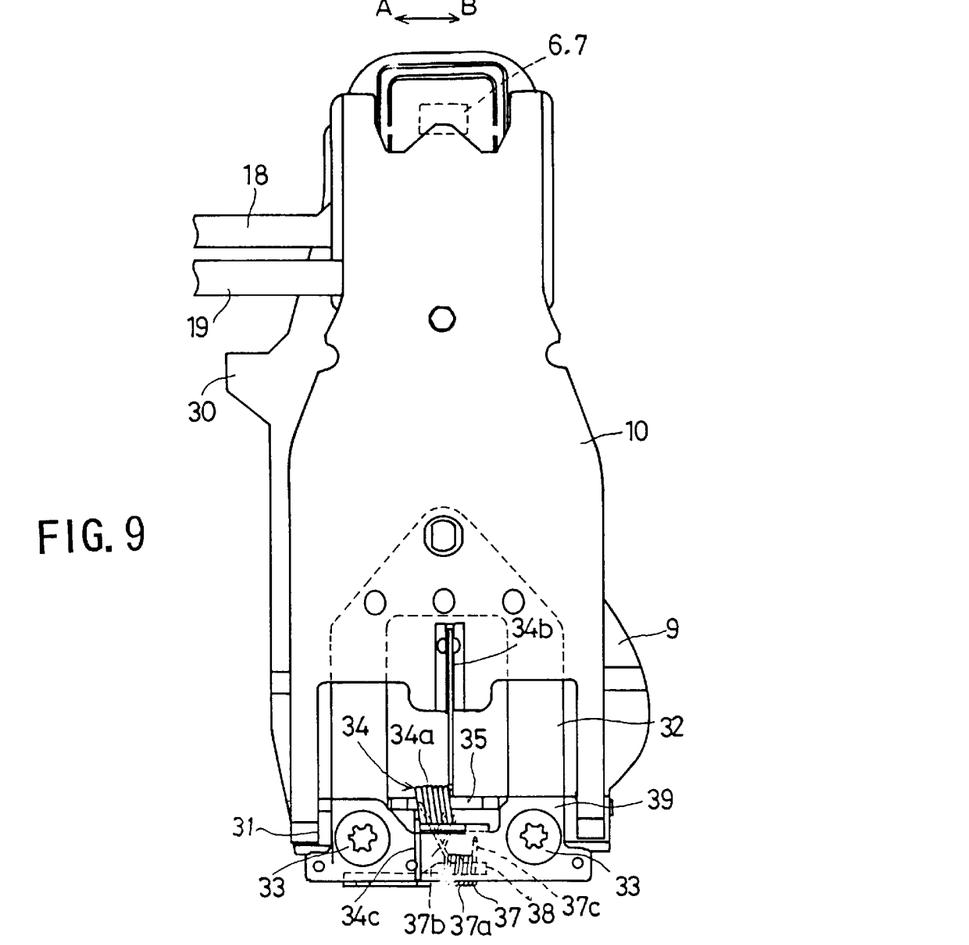
FIG. 9 is top view of the head carriage.
Figure 10:
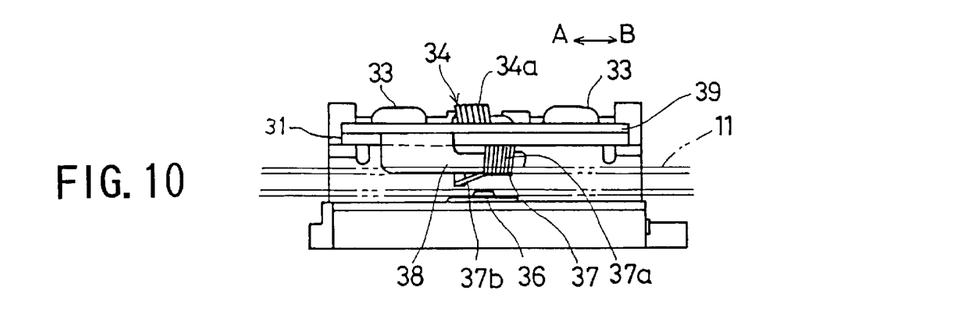
FIG. 10 is a rear view of the head carriage.

A description will now be given, with reference to FIGS. 8, 9, 10, 11A, 11B and 11C, of the head carriage 8; FIG. 8 is a side view of the head carriage 8; FIG. 9 is a top view of the head carriage 8; FIG. 10 is a rear view of the head carriage 8; and FIGS. 11A through 11C explain the carriage main body 9.

Figure 11A:
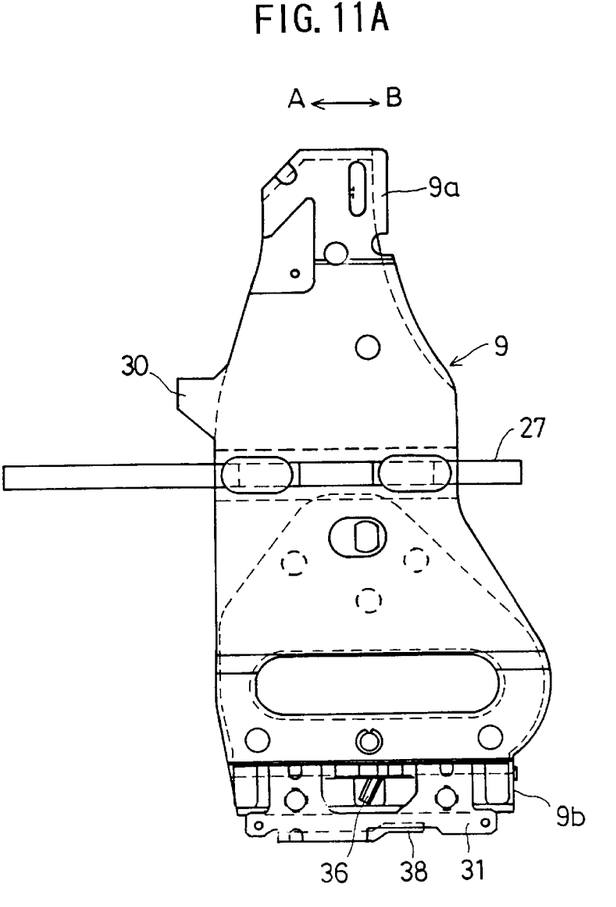
FIG. 11A is a top view showing the construction of the head carriage.
Figure 11B:
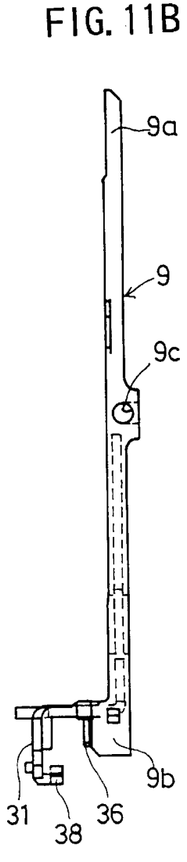
FIG. 11B is a side view showing the construction of the head carriage.
Figure 11C:
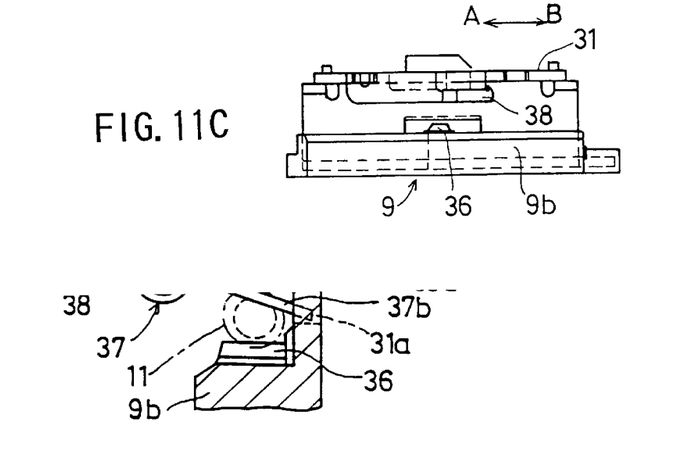
FIG. 11C is a rear view showing the construction of the head carriage.

The head carriage 8 has the carriage main body 9 formed of a synthetic resin and a sheet metal part formed integral with each other and further has the head arm 10 provided above the carriage main body 9 so as to be rotatable to approach the carriage main body 9 or to be removed therefrom. As shown in FIGS. 11A through 11C, a gimbal fitting part 9a for supporting the magnetic head 6 is provided at the end of the carriage main body 9, and a lead screw supporting part 9b for supporting the lead screw 11 is provided at the base of the carriage main body 9.

The carriage main body 9 is provided with a through hole 9c in which a guide shaft 27 passes through. The head is moved such that the carriage main body 9 slides along the guide shaft 27 so as to be guided in the A direction and B direction.

A detecting piece 30 for detecting of the track position is provided so as to project from the side of the carriage main body 9 in the A-B direction and to lie parallel with the surface of the circuit board 16. When the magnetic heads 6 and 7 are located on the outermost track "00" of the disk, the detecting piece 30 comes to a position aligned with the position at which the track position detecting sensor 17 is provided. Thus, the track position detecting sensor 17 outputs a signal indicating that the track "00" is detected when the detection piece 30 is detected.

A support part 31 for supporting the head arm 10 projects upward from the lead screw supporting part 9b.

A blade spring 32 has its one end fixed to the supporting part 31 by a vise 33 and its other end coupled to the underside of the head arm 10. The head arm 10 can be rotated so as to elevate or lower the magnetic head 7 provided at its end in response to the deflection of the plate spring 32. The top of the supporting part 31 is provided with a torsion spring supporting part 35 which is inserted in a coil 34a of a torsion spring 34 to support the coil 34a.

An end 34b of the torsion spring 34 presses the topside of the head arm 10 downward, and the other end 34c is latched by the supporting part 31. As a result, the head arm 10 is pressed downward by the torsion spring 34 so that the upper magnetic head 7 is urged downward. The pressure provided by the torsion spring 34 presses the magnetic heads 6 and 7 against the surface of the disk.

An engaging projection 36 engageable with the spiral groove of the lead screw 11 from below is provided on the topside of the lead screw supporting part 9b. The engaging projection 36 is formed to be integral with the synthetic-resin carriage main body 9 so as to lie in a diagonal angle which corresponds to angle in which the slanting groove of the lead screw 11 runs.

When the lead screw 11 is rotated by the stepping motor 13, the engaging projection 36 is moved in the A-B direction a distance which corresponds to the rotation angle. Therefore, as long as the engaging projection 36 remains engaged with the lead screw 11, the head carriage 8 can be moved in the A-B direction by a distance which corresponds to the rotation of the lead screw 11.

A torsion spring 37 is provided so as to press the lead screw 11 against the engaging projection 36. The torsion spring 37 has a coil 37a fitted to a spring supporting part 38 projecting downward at the rear end of the supporting part 31. The torsion spring 37 has one end 37b extending across the top of the lead screw 11 and inserted into an latching hole 31a (see FIG. 12) of the supporting part 31.

Figure 12:
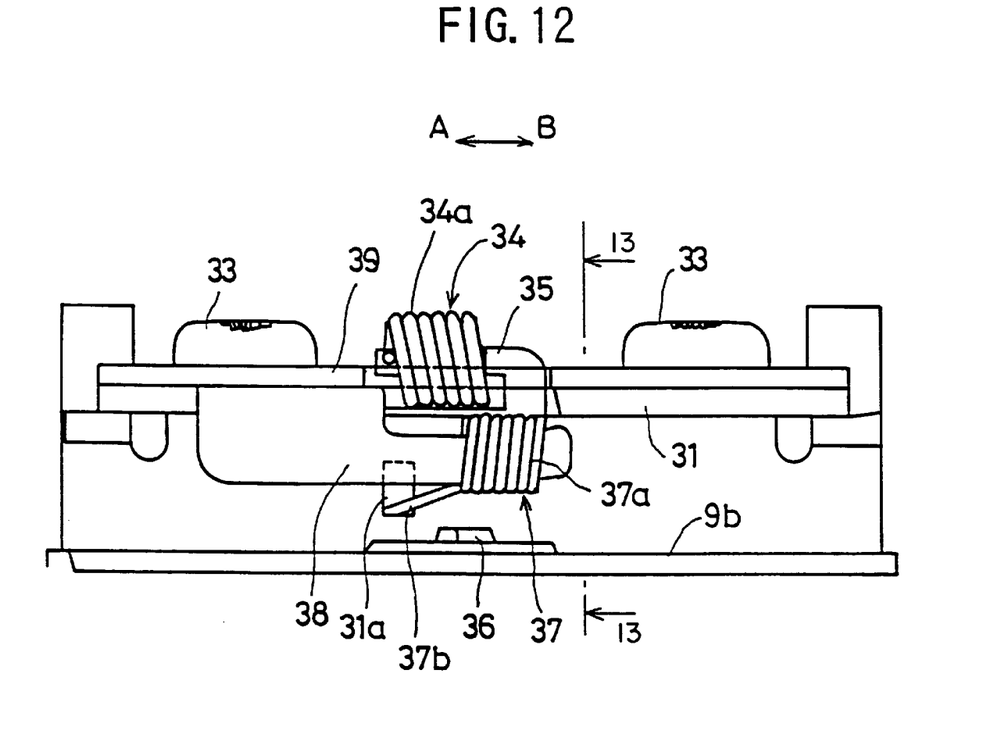
FIG. 12 is an enlarged rear view of the head carriage.

As a result, the end 37b of the torsion spring 37 is vertically movable within the latching hole 31a so as to be variably displaced with respect to the lead screw 11 in a predetermined range. The other end 37c of the torsion spring 37 is latched by the supporting part 31.

Figure 13:
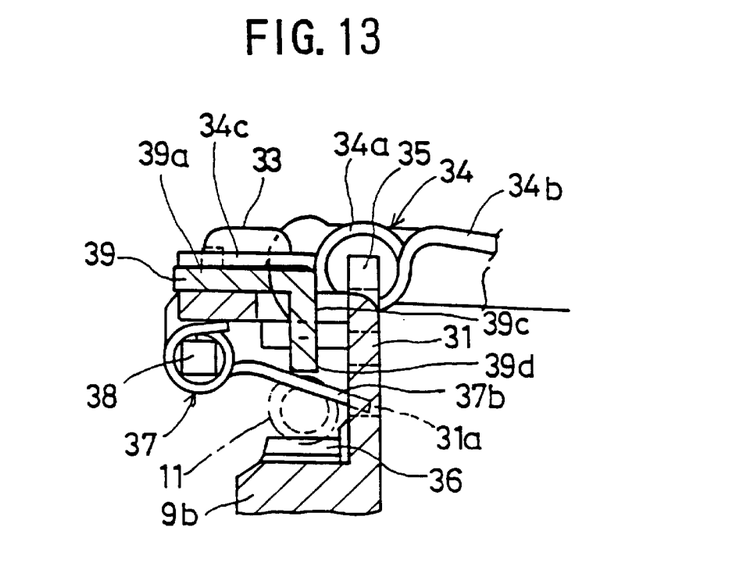
FIG. 13 is an enlarged sectional view taken along the line 13—13 of FIG. 12.

FIG. 12 is an enlarged rear view of the head carriage 8; and FIG. 13 is an enlarged sectional view taken along the line —13—of FIG. 12.

Before the lead screw 11 is inserted into the lead screw supporting part 9b, the end 37b of the torsion spring 37 is in contact with the lower end of the latching hole 31a. When the lead screw 11 is inserted into the lead screw supporting part 9b, the end 37b of the torsion spring 37 is displaced upward and engaged with the spiral groove of the lead screw 11. As a result, the lead screw 11 is pressed and maintained in engagement with the engaging projection 36 due to a spring force of the torsion spring 37.

The lead screw 11 is formed of a metal such as a stainless steel and is rotatably supported at both ends thereof. Therefore, the lead screw is capable of rotating the head carriage 8 in a stable manner even when it bears a load. Due to the pressing action of the end 37b of the torsion spring 37 against the lead screw 11, a reaction to this spring force is exerted on the carriage main body 9 so that the engaging projection 36 is properly engaged with the spiral groove of the lead screw 11.

A restraining member 39 for restraining relative displacement of the lead screw 11 with respect to the head carriage 8 is fitted to the supporting part 31 of the lead carriage main body 9.

Figure 14A:
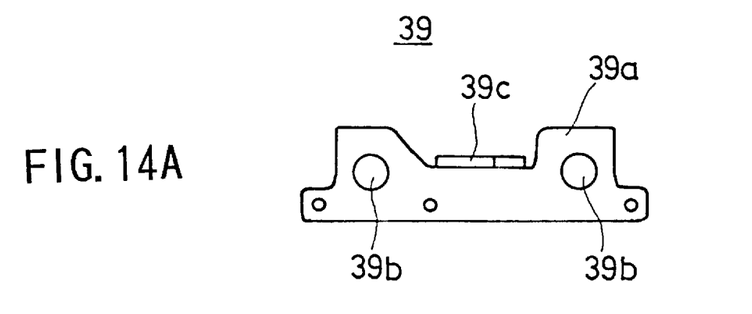
FIG. 14A is a top view showing the configuration of the restraining member.
Figure 14B:
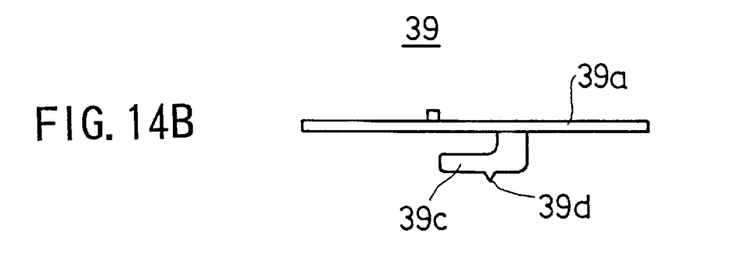
FIG. 14B is a side view showing the configuration of the restraining member.

FIG. 14 shows the configuration of the restraining member 39. The restraining member 39 is formed of a metal such as a stainless steel that is strong enough to restrain relative displacement of the lead screw 11 with respect to the head carriage main body 9. The restraining member 39 is fixed, together with the blade spring 32, to the supporting part 31 by vises 33.

The restraining member 39 comprises a flat part 39a for sandwiching the blade spring 32 on the supporting part 31; a restraining part 39c projecting downward from the flat part 39a between a pair of holes 39b through which vises 33 are inserted and extending parallel with the lead screw 11; and a projection 39d projects from the bottom of the restraining part 39c and is engaged with the spiral groove of the lead screw 11 from above. The projection 39d is formed to have a substantially trapezoidal shape which corresponds to the sectional shape of the spiral groove. As will be described later, when engaged with a given groove of the lead screw 11 in the event of an external shock, the projection 39d is 180° displaced with respect to the engaging projection 36.

Figure 15:
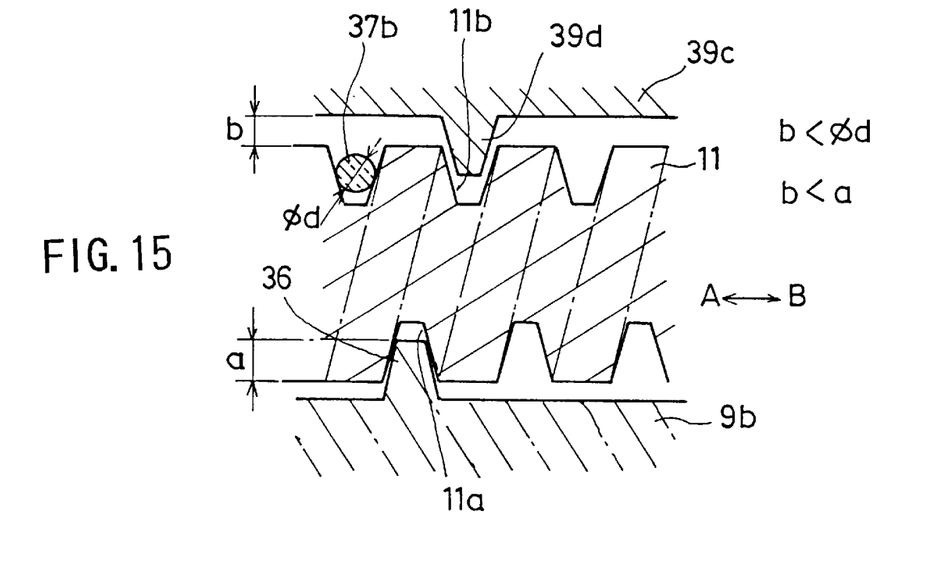
FIG. 15 is an enlarged longitudinal sectional view showing the lead screw, the engaging projection and the restraining member in a normal state.
Figure 16:
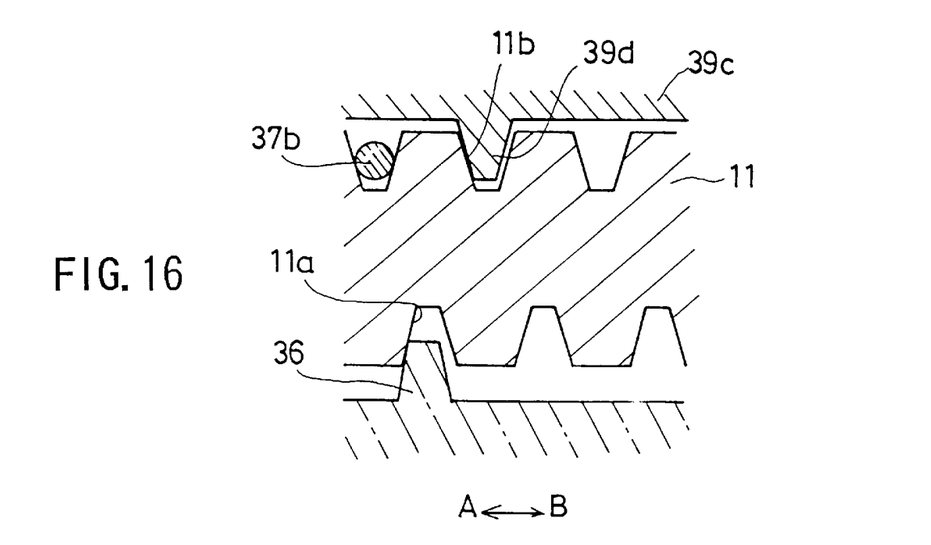
FIG. 16 is an enlarged longitudinal sectional view showing the lead screw, the engaging projection and the restraining member when a shock is applied in the axial direction.

FIG. 15 is an enlarged longitudinal sectional view showing the lead screw 11, the engaging projection 36 and the restraining member 39 in a normal operating state. FIG. 16 is a longitudinal sectional view showing how the operation is effected when a shock is applied in the axial direction.

Under normal conditions, the lead screw 11 is pressed downward by the end 37b of the torsion spring 37. Due to the reaction to this pressing action, the engaging projection provided to be integral with the carriage main body 9 is engaged with a recess 11a of the spiral groove of the lead screw 11 from below.

Normally, the restraining part 39c of the restraining member 39 is removed from the lead screw 11 so that the projection 39d projecting downward from the restraining part 39c is inserted into a recess 11b of the spiral groove of the lead screw 11 from above but is not in contact with the spiral groove. That is, only the engaging projection 36 is engaged with the lead screw 11 and the projection 39d of the restraining member 39 is out of engagement with the spiral groove. This is to ensure tracking precision of the magnetic heads 6 and 7 by controlling the movement of the head carriage 8 using only the engagement of the engaging projection 36 with the lead screw 11.

A distance b between the periphery of the lead screw 11 and the restraining part 39c of the restraining member 39 is set to a value smaller than an engagement depth a at which the engaging projection 36 and the recess 11a become engaged with each other. The distance b is also set to a value smaller than the diameter of the end 37b of the torsion spring 37.

When an external shock is applied to the disk drive apparatus 1 having the above-described construction, a shock (hereinafter, referred to as a rotational shock) which acts to rotate the head carriage 8 about the guide shaft 27; and a longitudinal (A-B direction) shock are applied to the head carriage 8.

When the rotational shock about the guide shaft 27 is applied to the head carriage 8, the head carriage 8 is displaced vertically with respect to the lead screw 11 because the lead screw 11 has a satisfactory strength and is rotatably supported at its ends.

Referring to FIG. 15, when the head carriage 8 is displaced upward, the engaging projection 36 is displaced so as to be engaged with the recess 11a of the lead screw 11. Therefore, the head carriage 8 becomes stationary when the engaging projection 36 comes into contact with the recess 11a from below.

When the head carriage 8 is displaced downward, the projection 39d of the restraining member 39 comes into contact with the recess 11b of the lead screw 11. Further, the restraining part 39c comes into contact with the periphery of the lead screw 11 so as to restrain the downward displacement of the head carriage 8. To summarize, when the head carriage 8 is displaced downward, the projection 39d, and the restraining part 39c of the restraining member 39 come into contact with the recess 11b, and the periphery of the lead screw 11, respectively, so that a further downward displacement of the head carriage 8 is prevented.

Since the distance b between the periphery of the lead screw 11, and the restraining part 39c of the restraining member 39 is smaller tan the engagement depth a at which the engaging projection 36 and the recess 11a become engaged with each other (b <a), the engaging projection 36 remains engaged with the recess 11a even if the head carriage 8 is displaced downward by the distance b. Therefore, even when the rotational shock about the guide shaft 27 is applied to the head carriage 8, this embodiment is free of a problem that the engaging projection 36 is released from engagement with the recess 11a, making it impossible to drive the head carriage 8.

A consideration will now be given of a case where the axial (A-B direction) shock is applied to the head carriage 8. As shown in FIG. 16, the engaging projection 36 having a trapezoidal section and the recess 11a are engaged with each other. Therefore, the rotational shock causes a relative downward displacement of the engaging projection 36 along the slope of the recess 11a.

The projection 39d of the restraining member 39 provided opposite the engaging projection 36 comes into contact with the recess 11b of the lead screw 11 so as to restrain the downward displacement of the head carriage 8. That is, the axial displacement of the head carriage 8 is prevented by the projection 39d of the restraining member 39.

The rotational shock applied to the head carriage 8 is born by the projection 39d of the restraining member 39 and the engaging projection 36. That is, the shock is distributed between the projection 39d and the engaging projection 36.

Therefore, according to this embodiment, concentration of the rotational load on the engaging projection 36 which may occur in the conventional disk drive apparatus and damage the engaging projection 36, is prevented. Therefore, the disk drive apparatus constructed according to this embodiment avoids of a problem that the engaging projection 36 is damaged in the event that a shock is applied to the disk drive apparatus 1, making it impossible to drive the head carriage 8 and avoids a problem that the position at which the engaging projection 36 is engaged with the lead screw 11 is displaced, causing the position at which the magnetic heads 6 and 7 slide on the track to be displaced.

While the engaging projection 36 is formed of a synthetic resin, the restraining member 39 is formed of a metal having a satisfactory strength. Therefore, there is no likelihood that the projection 39d of the restraining member 39 is deformed or damaged even if an excessive shock is applied to the carriage 8. Accordingly, the engaging projection 36 can be prevented from being damaged.

While the magnetic disk drive apparatus is taken as an example in the above description, it is of course possible to apply this embodiment to other apparatuses such as an optical disk drive apparatus or a magneto-optical disk drive apparatus.

The present invention is not limited to the above described embodiments, and variations and modifications may be made without departing from the scope of the present invention.

What is claimed is:

1. A disk drive apparatus comprising:

a head carriage provided with magnetic heads;

a lead screw extending in a radial direction of a disk and driven into rotation, an engaging part of said head carriage engaged with a spiral groove of said lead screw and transmitting a driving force of said lead screw to said head carriage;

a restraining member remaining detached from said spiral groove of said lead screw during a normal operation, said restraining member being provided at a base of said head carriage to be engageable with said lead screw and engages within said spiral groove of said lead screw when an external shock is applied to said head carriage so as to restrain relative displacement of said head carriage with respect to said lead screw, whereby the external shock is distributed to the engaging part and the restraining member, a separation between said lead screw and said restraining member being smaller than a depth of engagement between said engaging part of said head carriage and said lead screw; and wherein said apparatus further comprises a torsion spring having one end thereof fitted to the head carriage and another end of said torsion spring for thrusting said lead screw against said engaging part of said head carriage, said torsion spring being engaged with the spiral groove of the lead screw.

2. A disk drive apparatus comprising:

a head carriage provided with magnetic heads;

a lead screw extending in a radial direction of a disk and driven into rotation, an engaging part of said head carriage engaged with a spiral groove of said lead screw and transmitting a driving force of said lead screw to said head carriage; and a restraining member remaining detached from said spiral groove of said lead screw during a normal operation, said restraining member being provided at a base of said head carriage to be engageable with said lead screw and engages within said spiral groove of said lead screw at a position that is 180° displaced with respect to said engaging part of said head carriage when an external shock is applied to said head carriage so as to restrain relative displacement of said head carriage with respect to said lead screw, whereby the external shock is distributed to the engaging part and the restraining member, a separation between said lead screw and said restraining member being smaller than a depth of engagement between said engaging part of said head carriage and said lead screw, and wherein said apparatus further comprises a torsion spring having one end thereof fitted to the head carriage and another end of said torsion spring engaged with the spiral groove of the lead screw for thrusting said lead screw against said engaging part of said head carriage.

3. The disk drive apparatus as claimed in claim 2, wherein a separation between said lead screw and said restraining member is smaller than a diameter of said torsion spring.

* * * * *